United States Patent
Yoshioka

(10) Patent No.: US 7,207,349 B1
(45) Date of Patent: Apr. 24, 2007

(54) HYDRAULIC FLOW PRESSURE SWITCH

(75) Inventor: Jun Yoshioka, Fort Wayne, IN (US)

(73) Assignee: Torque-Traction Technologies, LLC., Maumee, OH (US)

( * ) Notice: Subject to any disclaimer, the term of this patent is extended or adjusted under 35 U.S.C. 154(b) by 819 days.

(21) Appl. No.: 10/115,000

(22) Filed: Apr. 4, 2002

(51) Int. Cl.
   *F16K 17/30* (2006.01)
   *F16K 21/02* (2006.01)

(52) U.S. Cl. .................. 137/513.5; 137/517

(58) Field of Classification Search .......... 137/460, 137/513.3, 513.5, 517
   See application file for complete search history.

(56) References Cited

U.S. PATENT DOCUMENTS

| | | | |
|---|---|---|---|
| 922,578 A | 5/1909 | Gries | |
| 1,764,181 A * | 6/1930 | Raetz et al. | 137/513.5 |
| 2,647,533 A * | 8/1953 | Beymer | 137/517 |
| 2,917,077 A | 12/1959 | Ziege | |
| 2,929,402 A * | 3/1960 | Streeter | 137/517 |
| 3,143,135 A * | 8/1964 | Gail | 137/517 |
| 3,454,182 A * | 7/1969 | Morton | 137/513.5 |
| 3,841,350 A * | 10/1974 | Griensteidl et al. | 137/517 |
| 4,257,452 A | 3/1981 | Hill et al. | |
| 4,874,012 A | 10/1989 | Velie | |
| 4,932,435 A | 6/1990 | Stroze et al. | |
| 4,934,405 A * | 6/1990 | Brownfield | 137/517 |
| 5,465,751 A | 11/1995 | Newton | |
| 5,613,518 A | 3/1997 | Rakieski | |
| 6,123,101 A | 9/2000 | Velie et al. | |

FOREIGN PATENT DOCUMENTS

| | | | | |
|---|---|---|---|---|
| DE | 374621 | * | 4/1923 | 137/517 |
| DE | 1118559 | * | 11/1961 | 137/517 |
| GB | 1595414 | * | 8/1981 | 137/517 |

* cited by examiner

*Primary Examiner*—John Rivell
(74) *Attorney, Agent, or Firm*—Berenato, White & Stavish

(57) ABSTRACT

A pressure switch or valve for a hydraulic circuit that responds primarily to fluid flow as opposed to relying strictly on a pressure gradient across the valve. A T-shaped valve has a stem portion disposed within an opening in a reservoir or other fluid passage. The valve is spring biased in an open position. A valve head has an area significantly larger than an area of the opening. As fluid flows around the edge of the valve head, the fluid speed increases and induces a pressure gradient across the valve head to overcome the spring bias and close the valve. The valve may be employed in a wall surface of the reservoir or fluid passage having an area significantly larger than the valve head.

15 Claims, 1 Drawing Sheet

HYDRAULIC FLOW PRESSURE SWITCH

BACKGROUND OF THE INVENTION

1. Field of the Invention

This invention relates to a check valve, and more particularly to a spring biased check valve that reacts primarily to fluid flow rather than strictly in response to a pressure gradient across the valve.

2. Description of the Prior Art

Spring biased check valves biased in the open position are well known in the art. Many applications require a valve to close in response to an increased pressure or excessive fluid flow within a fluid device. One such valve is disclosed in FIG. 1 of U.S. Pat. No. 4,874,012. Under low fluid flow conditions a compression spring maintains a valve poppet in a position spaced upstream from an upstream end of the seat body and fluid flow is maintained through a tubular conduit. Upon an increase of fluid flow above a predetermined flow rate, the valve poppet constitutes a restriction and therefore a greater pressure on the upstream side of the valve poppet over the downstream side thereof overcomes the biasing action of the spring and the poppet valve shifts to close the valve. However, this conventional design has limited applications.

In order to create a sufficient pressure gradient, the poppet valve head must be dimensioned within the tubular conduit to create a restriction in the fluid flow. As more fluid is forced through the conduit, the restriction induces the necessary pressure gradient to overcome the bias of the spring and close the valve. Thus the size of the valve head in relation to the tubular conduit in which the fluid flows is limited if not predetermined. If the valve head is too small relative to the conduit and there exists a significant space between the components, sufficient pressure gradient will not be induced and the valve will not close. Conversely, if the valve head is too large, the amount of fluid allowed to flow through the conduit will diminish defeating the ability to permit flow in an opened position. Thus the size of the valve head is strictly dependent on the dimensions of the surrounding space in which the fluid flows. A valve head of any other dimension will yield an unworkable device. Such check valves of the prior art will not work if simply installed in a wall having a significant area. If such a valve were placed on a larger wall surface area, no matter what level the pressure reached within the reservoir body, the valve would not close, as the geometry does not provide the required restriction to induce the pressure gradient across the valve head. Thus these prior art devices do not provide the ability to retrofit a reservoir with a generic valve assembly by simply installing a valve through a wall surface of generic geometry.

SUMMARY OF THE INVENTION

The present invention is directed to a pressure switch or valve for a hydraulic circuit that responds primarily to fluid flow about the valve as opposed to relying strictly on a pressure gradient across the valve. A T-shaped valve has a stem portion disposed within an opening in a reservoir, housing, or other fluid passage. The valve is spring biased in an open position. A valve head has an area significantly larger than an area of the opening. As fluid flows around the edge of the valve head, the fluid speed increases and induces a pressure gradient across the valve head to overcome the spring bias and close the valve. The valve may be employed in a wall surface of the reservoir or fluid passage having an area significantly larger than the valve head.

These and other benefits of the present invention will become apparent from the following description and associated drawings.

DESCRIPTION OF THE PREFERRED EMBODIMENT

Figure 1:
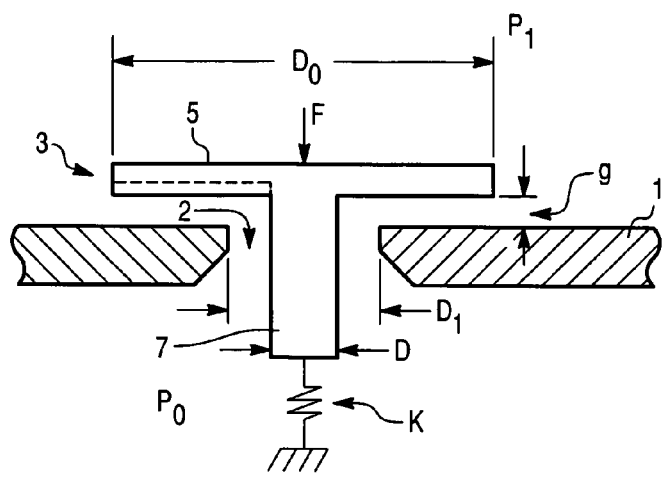
FIG. 1 is a partial sectional view of the valve switch and schematic representation of the biasing spring according to the present invention.

FIG. 1 depicts a partial sectional of the hydraulic switch mounted on a wall surface 1 of a fluid reservoir, housing, or conduit. The present invention is directed to a valve switch that reacts to fluid flow rather than pressure. The design allows the valve to close in response to fluid flow across the valve body rather than depend on a restriction to cause a pressure differential. As such, the valve body may be disposed directly through a large wall surface 1 of infinite area. FIG. 1 only partially depicts the wall surface 1. However, it is to be understood that the wall surface may be substantially larger than the area of the valve head 5 and the operation of the valve assembly is in no way dependent on the size or geometry of the wall surface 1.

A T-shaped valve body having a valve stem 7 and a disc shaped valve head 5 is slidably disposed within an annular opening 2 in the wall surface 1 of the reservoir/housing to open and close the opening 2. A spring k mechanism is schematically depicted to bias the valve body and valve head in an opened position to allow fluid to flow through the wall surface 1 of the reservoir. It is to be understood that one of ordinary skill in the art posses the knowledge to implement one of many known mechanisms to secure the spring k to the valve stem 7 or valve head 5 to bias the valve body in an opened position. The particular arrangement of the biasing mechanism is not crucial to the operation of the present invention so long as the valve body is biased in the open position. Such arrangements are well known to ones or ordinary skill in the art. It is also to be understood, that the mechanism to limit displacement of the valve body in the open position to define a specific gap g between the wall surface 1 and valve head 5 is also within the knowledge of one of ordinary skill in the art and need not be shown or described in detail.

$P_1$ represent the pressure of fluid within the reservoir, housing or fluid-conduit bounded by wall surface 1. $P_0$ represents the pressure external to the reservoir, housing on the opposite side of the wall 1. When $P_1$ is greater than $P_0$, fluid will flow around the valve head 5 and through the opening 2 exiting the reservoir. However, the valve arrangement of the present invention does not strictly rely on the pressure differential between $P_1$–$P_0$ or across the valve head 5, but rather responds to fluid flow. The valve head 5 has a diameter $D_0$. The opening has a diameter D. It is noted that $D_0$ is substantially larger than the diameter of the opening D. Moreover, when the valve body is in the open position, the valve head 5 is positioned within a distance g from the wall surface 1 defining the gap there between. As the fluid flows and is forced around the disc shaped valve head 5, a pressure gradient is induced across the valve head 5 generating a force F on the valve body to close the valve. As the amount of fluid flow increases, so does the force F on the valve head 5. When there is sufficient fluid flow, the force F will exceed the biasing force of the spring k and the valve will close. Once the valve is closed, and the fluid flow inhibited, the valve will remain closed while $P_1$ is sufficiently greater than $P_0$ to overcome the force of spring k. However, the valve will initially close from an opening position only if sufficient fluid flows across the valve head.

The following equation represents the force induced on the valve head $$F = (D_1/2)^2 * \pi * (P_1 - P_0) - \int_{D0/2}^{D1/2} \pi * \rho * (v_1^2 - v_2(r)^2) * r * dr$$

Where:

$D_0$ = Diameter of Valve Head 5

$D_1$ = Diameter of opening 2

$P_1$ = Pressure within Reservoir $P_0$ = Pressure outside Reservoir $\rho$ = fluid density $V_1$ = fluid velocity at the edge $V_2$ = fluid velocity at a radius $r$ $r$ = Radial distance from center of the valve The relationship to gap 'g' is implicit in $V_1$ and $V_2$. The fluid velocity is dependent on the gap size.

This is the derivation of the equation for the force generated by the pressure switch, the basis of the equation is the flow in a conduit based on a pressure drop across 2 cross sections of different sizes $$Q = \sqrt{\frac{2}{\rho} \cdot \frac{P_1 - P_2}{\frac{1}{A_2^2} - \frac{1}{A_1^2}}}$$

That can be developed to:

$$Q^2 = \left(\frac{2}{\rho}\right) \cdot \left[\frac{\Delta P}{\left(\frac{1}{A_2^2} - \frac{1}{A_1^2}\right)}\right] \text{ and}$$

$$\Delta P = \frac{Q^2}{\left(\frac{2}{\rho}\right)} \cdot \left(\frac{1}{A_2^2} - \frac{1}{A_1^2}\right) \text{ and } \Delta P = \frac{\rho}{2} \cdot \left(\frac{Q^2}{A_2^2} - \frac{Q^2}{A_1^2}\right)$$

resulting in:

$$\Delta P = \frac{\rho}{2} \cdot (v_2^2 - v_1^2)$$

From the above pressure drop relationship, a resultant force due to flow around the pressure switch can be calculated as a pressure times an area as follows: $f = \Delta P \cdot (area)$ develops into:

$$F(r) = (\pi \cdot \rho) \cdot \int_{r_0}^{r_1} (v_2(r)^2 - v_1^2) \cdot r \, dr$$

for a circular shape cross sectional area.

As a numerical example the following sizes are used:

$$D_0 := 25 \cdot mm \quad D_1 := 5 \cdot mm \quad D := 3 \cdot mm \quad gap := 0.3 \cdot mm$$

$$\rho := 1.10^3 \cdot \frac{kg}{m^3} \quad P_1 := 15.7 \cdot psi \quad P_0 := 14.7 \cdot psi$$

Because the area at the smaller diameter of the pressure switch valve $D_1 \cdot \pi \cdot gap = 4.712$ mm$^2$ is smaller than the area defined by the difference in area between the pin and the passage hole $$\left(\frac{D_1}{2}\right)^2 \cdot \pi - \left(\frac{D}{2}\right)^2 \cdot \pi = 12.566 \text{ mm}^2$$

the flow is governed by the first area calculated.

$$A_1 := \pi \cdot D_0 \cdot gap \quad A_1 = 23.562 \text{ mm}^2$$
$$A_2 := \pi \cdot D_1 \cdot gap \quad A_2 = 4.712 \text{ mm}^2$$
$$Q := \sqrt{\frac{2}{\rho} \cdot \frac{P_1 - P_0}{\frac{1}{A_2^2} - \frac{1}{A_1^2}}} \quad Q = 1.09 \frac{\text{in}^3}{\text{sec}}$$

The fluid velocities can be calculated in relationship to the flow Q as follows:

$$V_1 := \frac{Q}{\pi \cdot D_0 \cdot gap}$$

and the velocity at a distance r from the center of the valve as follows:

$$V_2(r) := \frac{Q}{2 \cdot \pi \cdot r \cdot gap}$$

The force resultant from the pressure differential due to the passage hole is:

$$\left(\frac{D_1}{2}\right)^2 \cdot \pi (P_0 - P_1) = -0.135 N$$

and the force resultant from the pressure switch is $$\pi \cdot \rho \int_{\frac{D_0}{2}}^{\frac{D_1}{2}} (V_2(r)^2 - V_1^2) \cdot r \, dr = -0.319 N$$

showing that the forces generated by the flow are $$\frac{\left[ \pi \cdot \rho \int_{\frac{D_0}{2}}^{\frac{D_1}{2}} (V_2(r)^2 - V_1^2) \cdot r \, dr \right]}{\left[ \left(\frac{D_1}{2}\right)^2 \cdot \pi (P_0 - P_1) \right]} = 2.353$$

larger than the pressure differential itself demonstrating the primary effect of the flow in the pressure switch function The final expression for the forces from the pressure differential and flow is as follows:

$$F_{total}(r) = \left(\frac{D_1}{2}\right)^2 \cdot \pi (P_0 - P_1) + \pi \cdot \rho \cdot \int_{\frac{D_0}{2}}^{\frac{D_1}{2}} (V_2(r)^2 - V_1^2) \cdot r \, dr$$

As the fluid flow across and underneath the valve head 5 is forced to increase, a pressure gradient across the valve head is induced and thus a force is applied against the valve head 5 to close the valve body against the wall surface 1 to stop the flow of fluid through the opening 2. Thus the valve reacts to fluid flow across the valve head as opposed to pressure differential between $P_1$ and $P_0$.

Because the valve body reacts primarily to fluid flow as opposed to a strict reliance on a pressure gradient caused by a restriction between the valve head and the surrounding walls of a conduit, the valve may be placed in an opened an unconfined space of any fluid housing. For example, the valve assembly of the present invention may be retrofitted in any reservoir, housing or fluid system by simply drilling a hole through a wall of the reservoir or fluid conduit. No restriction about the valve head is necessary to induce the pressure gradient across the valve head 5 to close the valve as in the prior art.

Figure 2:
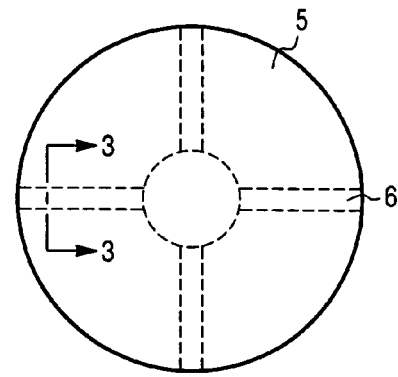
FIG. 2 is a top view of the valve body according to an alternate embodiment of the present invention.
Figure 3:
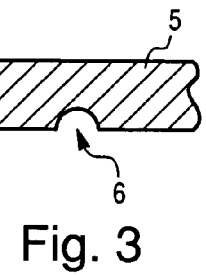
FIG. 3 is a partial sectional view of the valve body taken along lines 3—3 of FIG. 2.

FIG. 2 depicts a top view of the valve head 5 according to an alternate embodiment of the present invention. FIG. 3 Depicts a partial sectional view of the valve head of FIG. 2 taken along lines 3—3 of FIG. 2. In this embodiment, a plurality of radially extending bleed grooves 6 are formed on the underneath portion of the valve head 5. The bleed grooves 6 allow some fluid to pass through the valve while the valve body in a closed body. By varying the number or size of the grooves, a different flow/pressure profile can be achieved to meet different design characteristics.

Figure 4:
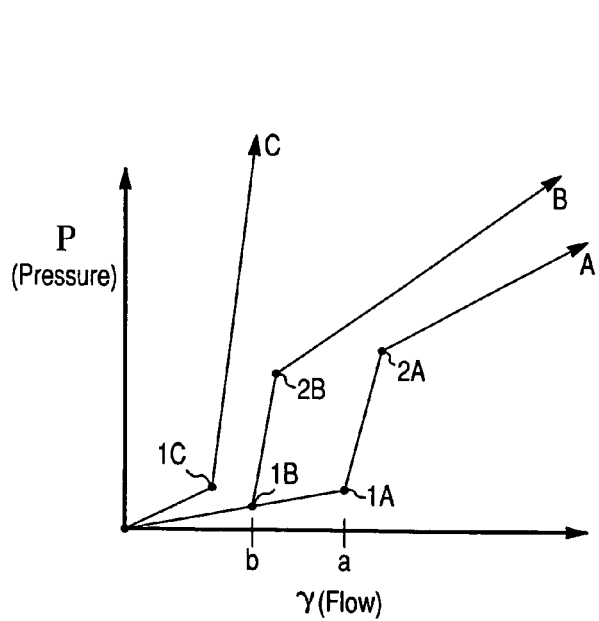
FIG. 4 is a graphical representation of the fluid flow in relation to the pressure drop across the valve body according to alternate embodiments of the present invention.

FIG. 4 depicts a graph representing the fluid flow in relation to pressure. As can be seen, graph line C represents a valve head 6 without any grooves. Fluid flow eventually ceases in response to the closing of the valve. Graph lines A and B represent valve heads having bleed grooves 6 of different size. In each representation A & B, it is clear that a large increase in pressure results in little increase in fluid flow as the valve head closes when the fluid flow reaches a & b, respectively, as a result of the reduction in passable area through opening 2. However, once in the valve has fully closed, the fluid flow increases in proportion to pressure as fluid is forced through the bleed grooves.

The valve may be tuned to within high tolerances for specific applications by manipulating the force of the biasing spring 6, the size and number of bleed grooves 6, providing particular springs, and the distance of gap g.

While the foregoing invention has been shown and described with reference to a preferred embodiment, it will be understood by those possessing skill in the art that various changes and modifications may be made without departing from the spirit and scope of the invention.

What is claimed is:

1. A hydraulic flow switch comprising:
   a reservoir body having an opening to permit flow there through from inside said reservoir body to outside said reservoir body;
   a valve body having a valve head and a valve stem, said valve stem being disposed within said opening and longitudinally slidable therein to facilitate displacement of said valve head between an open position to permit fluid flow through said opening and a closed position to substantially prohibit fluid flow through said opening, said valve head being positioned in an unconfined area of said reservoir relative to an area of said valve head;
   a biasing member connected to said valve body and applying a biasing force to said valve body to bias said valve body in said open position,
   wherein said area of said valve head is substantially larger than a passable area through said opening such that, when a pressure differential between said inside of said reservoir body and said outside said reservoir body is insufficient to overcome said biasing force, fluid flow across said valve induces a significantly increased pressure gradient across said valve head to overcome said biasing force and cause said valve head to move to said closed position and wherein said opening is substantially circular having a first diameter, said valve head being substantially circular and having a second diameter at least five times that of said first diameter.

2. The hydraulic flow switch according to claim 1, wherein said valve is disposed on a wall surface of said reservoir body, said wall surface having an area substantially larger than said area of said valve head.

3. The hydraulic flow switch according to claim 1, wherein said valve head and said valve stem form a substantially T-shaped valve body, said valve body having an inner surface engaging a surface of said reservoir body and covering said opening when in said closed position.

4. The hydraulic flow switch according to claim 1, wherein said biasing member is a spring k.

5. The hydraulic flow switch according to claim 1, wherein said opening is an annular opening through a substantially flat surface of said reservoir body, said valve stem being formed of a tubular member, said valve head being formed of a substantially disc shaped member such that when said valve body is in said closed position, said valve head engages said wall surface of said reservoir body over an area substantially larger than said area of said opening; and said substantially flat wall surface of said reservoir body having an area substantially larger than said disc shaped member of said valve head.

6. The hydraulic flow switch according to claim 1, wherein said first diameter is about 5 mm and said second diameter is about 25 mm and said valve head is positioned about 3 mm from said opening defining a gap of same dimension between said valve head and said reservoir body.

7. The hydraulic flow switch according to claim 1, wherein said valve includes at least one bleed groove formed on said an surface of said valve body to thereby permit residual fluid flow when said valve head is in said closed position.

8. A hydraulic flow switch comprising;
a reservoir body having an opening to permit flow therethrough;
a valve body having a valve head and a valve stem, said valve stem being disposed within said opening and longitudinally slidable therein to facilitate displacement of said valve head between an open position to permit fluid flow through said opening and a closed position to restrict fluid flow through said opening, said valve head being positioned in an unconfined area of said reservoir relative to an area of said valve head, wherein said valve head and said valve stem form a substantially T-shaped valve body, said valve body having an inner surface engaging a surface of said reservoir body and covering said opening when in said closed position;
a biasing member connected to said valve body and provided to bias said valve body in said open position, wherein said area of said valve head is larger than a passable area through said opening thereby causing a velocity of fluid flowing about said valve head to increase and induce a pressure gradient across said valve head thereby causing said valve head to overcome said biasing member and move to said closed position; and
at least one bleed groove formed on said inner surface of said valve body to thereby permit fluid flow when said valve head is in said closed position.

9. The hydraulic flow switch according to claim 8, wherein said at least one bleed groove comprises a plurality of radially extending grooves formed on said inner surface of said valve head establishing communication from an external peripheral surface of said valve head to said opening.

10. A hydraulic flow switch for use in a fluid flow path comprising:
a housing containing a fluid, said housing having an opening to permit fluid flow therethrough;
a valve body having a valve head disposed within said housing and a valve stem disposed within said opening and longitudinally slidable therein to facilitate displacement of said valve head between an open position to permit fluid flow through said opening and a closed position to prohibit fluid flow through said opening, said valve head being positioned in an unconfined area of said container relative to an area of said valve head;
a biasing member connected to said valve body and provided to bias said valve head in said open position,
wherein said area of said valve head is larger than a passable area through said opening thereby causing a velocity of fluid passing around said valve head to increase and induce a pressure gradient across said valve head thereby causing said valve head to overcome said biasing member and move to said valve head to said closed position
wherein said valve head and said valve stem form a substantially T-shaped valve body, said valve body having an inner surface engaging a surface of said housing and covering said opening when in said closed position and said device further comprising at least one bleed groove formed on said inner surface of said valve body to thereby permit fluid flow when said valve head is in said closed position.

11. The hydraulic flow switch according to claim 10, wherein said valve is disposed on a wall surface of said housing, said wall surface having an area substantially larger than said area of said valve head.

12. The hydraulic flow switch according to claim 10, wherein said at least one bleed groove comprises a plurality of radially extending grooves formed on said inner surface of said valve head establishing communication from an external peripheral surface of said valve head to said opening.

13. The hydraulic flow switch according to claim 10, wherein said biasing member is a spring.

14. A hydraulic flow switch for use in a fluid flow path comprising:
a housing containing a fluid, said housing having an opening to permit fluid flow therethrough;
a valve body having a valve head disposed within said housing and a valve stem disposed within said opening and longitudinally slidable therein to facilitate displacement of said valve head between an open position to permit fluid flow through said opening and a closed position to prohibit fluid flow through said opening, said valve head being positioned in an unconfined area of said container relative to an area of said valve head;
a biasing member connected to said valve body and provided to bias said valve head in said open position,
wherein said area of said valve head is larger than a passable area through said opening thereby causing a velocity of fluid passing around said valve head to increase and induce a pressure gradient across said valve head thereby causing said valve head to overcome said biasing member and move to said valve head to said closed position; and
wherein said opening is an annular opening through a substantially flat surface of said housing, said valve stem being formed of a tubular member, said valve head being formed of a substantially disc shaped member such that when said valve head is in said closed position, said valve head engages said wall surface of said housing over an area substantially larger than said area of said opening; and said substantially flat wall surface of said housing has an area substantially larger than said disc shaped member of said valve head, said device further comprising a plurality of radially extending grooves formed on an inner surface of said substantially disc shaped member thereby establishing communication from said substantially disc shaped member to said opening when said valve head is in said closed position.

15. A valve for use in controlling a fluid flow path comprising:
a housing containing a fluid, said housing having an a wall surface having an opening to permit fluid flow therethrough;
a T-shaped valve body having a valve head formed of a substantially disc shaped member and disposed within said housing and a valve stem disposed within said opening and longitudinally slidable therein to facilitate displacement of said valve head between an open position to permit fluid flow through said opening and a closed position to prohibit fluid flow through said opening, said wall surface having a first area substantially larger than an area of said substantially disc shaped member;
a spring biasing member connected to said valve body and provided to bias said valve head in said open position, wherein said area of said valve head is larger than a passable area through said opening thereby causing a velocity of fluid passing around said valve head to increase and induce a pressure gradient across said valve head thereby causing said valve head to overcome said spring biasing member and move to said valve head to said closed position, wherein said substantially disc shaped member includes a plurality of radially extending grooves 6 formed on an inner surface thereof thereby establishing communication from said substantially disc shaped member to said opening when said valve head is in said closed position.

* * * * *